Oct. 12, 1965

F. BUDIN ETAL 3,210,833

STORAGE BATTERY ASSEMBLY MACHINES

Filed Dec. 9, 1963

Oct. 12, 1965    F. BUDIN ETAL    3,210,833
STORAGE BATTERY ASSEMBLY MACHINES
Filed Dec. 9, 1963    5 Sheets-Sheet 4

United States Patent Office 3,210,833
Patented Oct. 12, 1965

3,210,833
STORAGE BATTERY ASSEMBLY MACHINES
François Budin, Paris, and Paul Chaix, Nanterre, France, assignors to Compagnie Generale d'Electricite, Paris, France
Filed Dec. 9, 1963, Ser. No. 328,930
Claims priority, application France, Dec. 7, 1962, 917,967
6 Claims. (Cl. 29—204)

This invention relates to means for accumulator manufacture, and more particularly, to the apparatus for feeding the respective elements necessary for the battery assembly operation from a series of aligned containers to an endless conveyor, thence depositing them endwise in seriatim into a receptacle which is then advanced to a soldering station.

It is well-known that when assembling the plates and separators of an accumulator cell, positive and negative plates are stacked alternately with the separators being inserted between the plates so as to separate two plates of opposite polarity. As a general rule, any such stack comprises an odd number of plates normally from five to twenty five and over, so that the end plates of the stack are of the same positive or negative type.

One of the objects of the invention is the provision of a new and improved apparatus for assembling and securing storage battery elements which comprises correlating a series of positive and negative plates having interposed separators therebetween and immediately thereafter advancing the correlated items or elements into a soldering position where the connecting straps are assembled to the terminal lugs of the positive and negative plates, respectively.

A still further object of the invention is the provision of mechanism comprising a closed-circuit feeder adapted to support a series of spacedly arranged, open topped receptacles into which a stack of battery-forming items or elements are positioned, subsequently advancing them to a soldering station, lifting the receptacle and its contents away from the drive means into contact with a soldering head and then lowering the same into driving relation with the feeder means and then advancing the soldered assembly to an unloading station.

Still another object of the invention is the provision of means on the receptacles in which the battery-forming elements are stacked for removing tension from a spring held end wall.

A further object of the invention is the provision of a means for assembly from an aligned array of holders containing separate stacked piles of positive and negative plates and separators, completely assembled elements each comprising the desired number of alternately disposed positive and negative plates with interposed separators.

Still another object of the invention is the provision of a traveling conveyor which moves adjacent to a horizontal table that is in substantially the same plane as the bottom wall of the holders which contain the stacked positive and negative plates as well as the separators, also being included means for removing substantially simultaneously from each of the holders a single element which is moved laterally into position for subsequent advancement to the conveyor by a suction means.

A still further object of the invention is the provision of means for synchronizing the various parts of the mechanism which advance the stacked elements from their respective holders into a position to be advanced into the receptacle and in which they then progress through the soldering and unloading stages.

In the preferred embodiment of the invention described hereinafter there is included a conveyor means which is adapted for supporting and transporting the battery-forming elements in the process of assembly, the conveyor being arranged to travel in a horizontal plane adjacent to a table above which and to one side thereof is positioned a series of holders for supporting stacks of plates and separators, in proper sequence, beginning with a stack of negative plates, thereafter a stack of separators and then a stack of positive plates, and last a stack of separators, this series being repeated to provide for the desired number of plates in the battery to be formed. Interposed between the traveling conveyor and the holders of stacked elements there is a vacuum apparatus adapted for lifting an aligned array of elements from the table after they are advanced into an area under the control of the vacuum apparatus by means of suitable pushing mechanism, the suction means thereafter depositing the elements on the conveyor for advancement to the receptacle which is moved in successive increments of reverse travel until the proper number of elements have been deposited therein. It is, of course, understood that the entire process is continuous, with the battery-forming elements being advanced from their stacking mechanism to the conveyor, thence to the feeder mechanism into and through the soldering operation and into the unloading station.

Still another object of the invention is the provision of an improved transfer station for moving storage battery elements comprising plates and separators from an aligning station to a filling station, thence to a soldering station and an unloading station, each of the operations being coordinated and in timed relation so that the elements are advanced to the conveyor and through each of the aforementioned steps in such a manner as to substantially reduce the cost of production of such batteries.

A still further object of the present invention is the provision of unique correlated means in the assembly station where individual elements comprising positive plates, negative plates and separators are removed from their holders and advanced through suction means to a conveyor table with the separators being rotated at 90° prior to being positioned on the conveyor for travel to the filling station.

The details of the invention, as well as additional objects and advantages, will be clearly understood with reference to the embodiments illustrated in the accompanying drawing employing similar reference numerals to identify the same elements in each of the several views, and in which.

Figure 1:
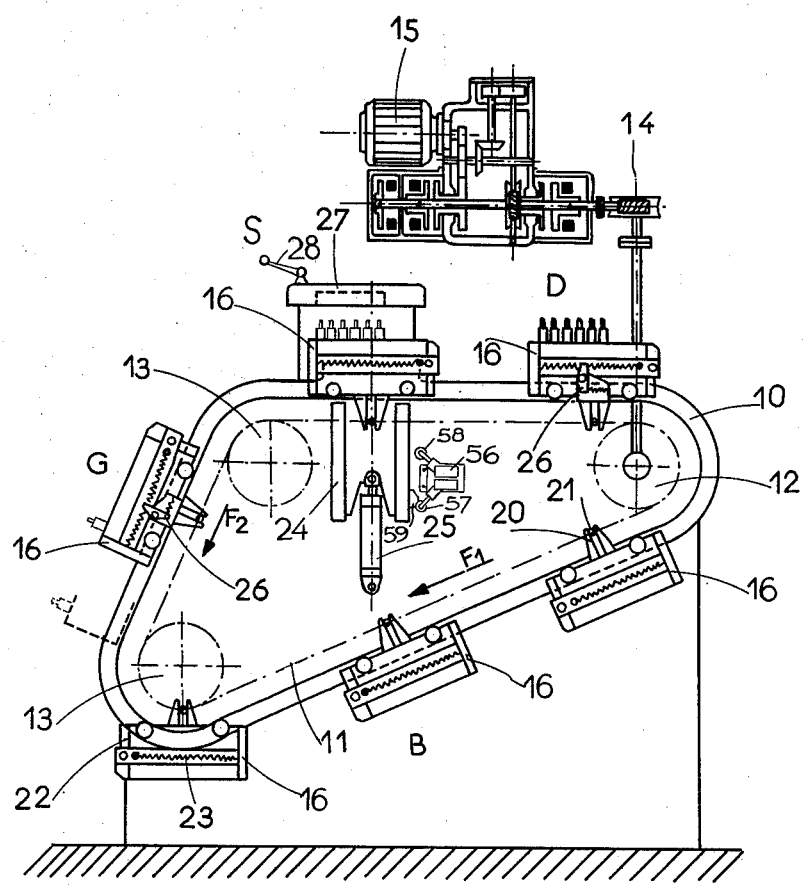
FIG. 1 is a diagrammatic elevational view of the means adapted to receive battery-building elements and subsequently advance them to soldering and unloading positions.
Figure 2:
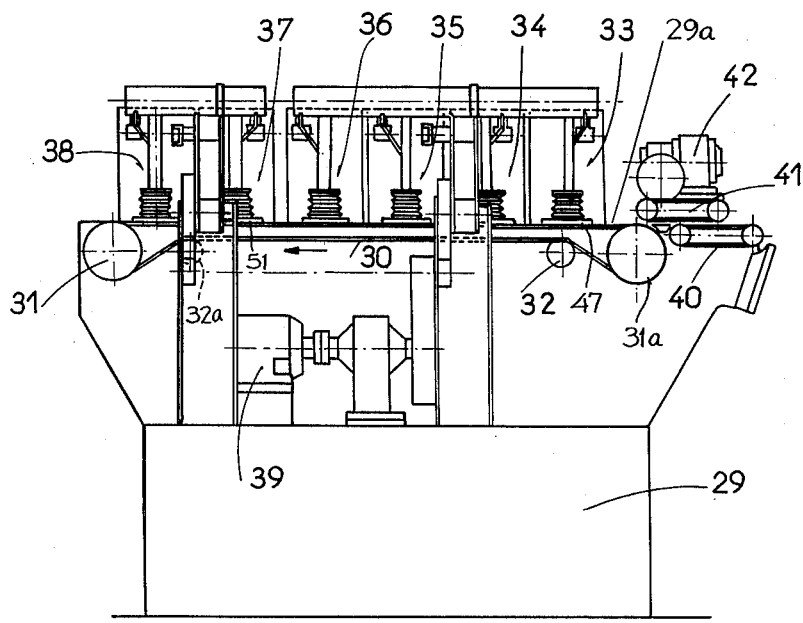
FIG. 2 is a diagrammatic elevational side view of the orienting means adapted for removing battery-building elements from containers and advancing them to a conveyor.
Figure 3:
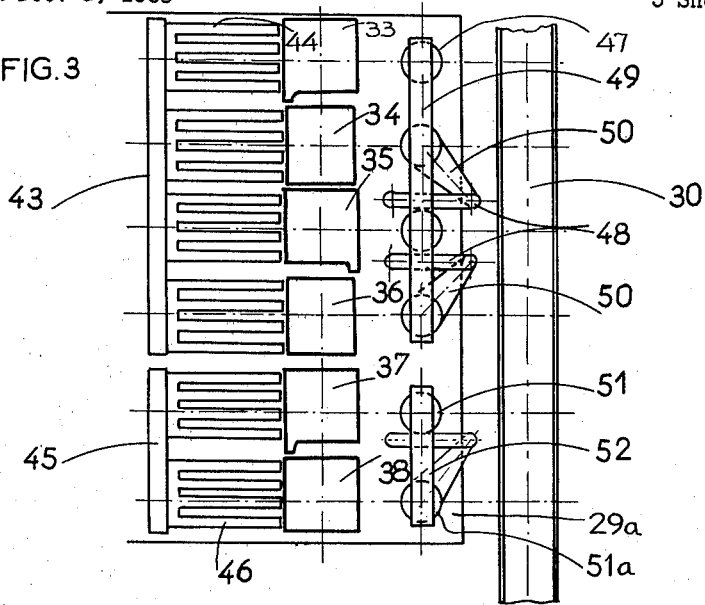
FIG. 3 is a diagrammatic top plan view of the means shown in FIG. 2 and in which the battery-building element discharging means is shown to the left of the containers in its inoperative position.
Figure 6:
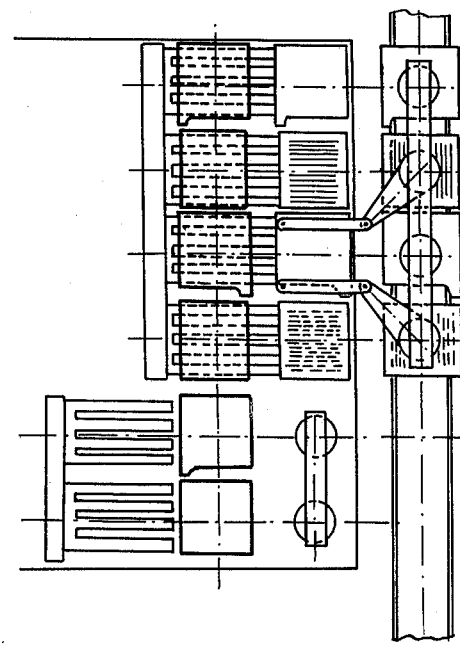
Figure 7:
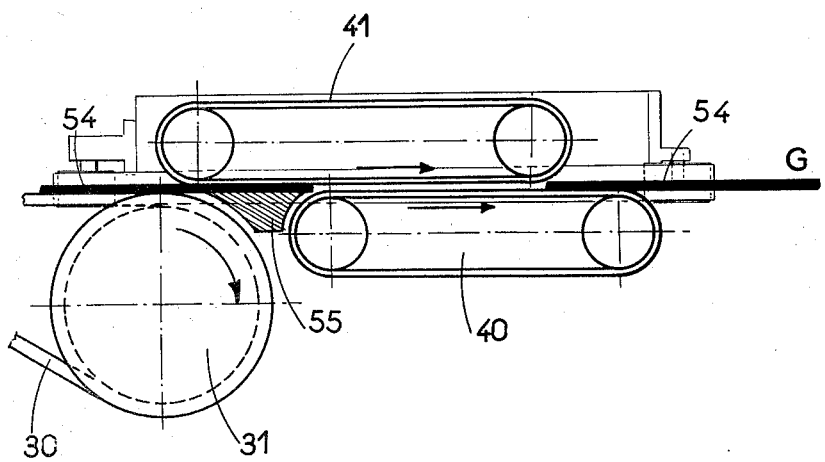

FIG. 6 is still a further diagrammatic top plan view of the means shown in FIG. 3 and in which the suction mechanism has now lifted a first group of battery-building elements from the table and moved them transversely to the conveyor during the course of which the separator elements are rotated 90° by the means illustrated; and FIG. 7 shows guide means for feeding the battery-building elements in seriatim from the means shown in FIG. 2 to the filling station of the means shown in FIG. 1.

In FIG. 1 of the invention there is shown an apparatus for receiving, at station G, an oriented series of positive and negative plates with separators interposed therebetween so as to provide the requisite polarities in the accumulator being assembled. As viewed in FIG. 1, the open topped receptacle or stack-forming means 16 is of generally rectangular configuration and includes at least three fixed or rigid, immovable walls, as well as one movable end wall, the latter being for a purpose that will become apparent as the description progresses. A plurality of these receptacles 16 are spacedly arranged on, and confined between, diametrically opposed trackways 10 by offstanding guide means carried by the receptacles. Interposed substantially medially thereof and beneath said trackways is an endless drive chain means 11 which travels through a substantially triangular path corresponding to and delineated by the trackways 10 about a drive pinion 12 and spaced idler means 13—13. The drive chain 11 is suitably motivated through a drive gearing means 14 by an electric motor and interrelated clutch and power stop controls and by means of which the chain 11 is caused to move either quickly in a clockwise direction as indicated by arrow F1 or slowly in the reverse direction according to arrow F2. This phase of the operation will be enlarged upon later herein.

As shown, the receptacles 16 are provided, substantially intermediate the bottoms thereof, with bifurcated means 20 which are adapted to engage the pins 21 associated with the drive chain 11.

Each of the open topped receptacles, or stack forming means 16, is provided with, as mentioned hereinbefore, a movable end wall 22, the inner surface of which is retained in juxtaposition relative to the two fixed side walls by means of a pair of springs 23 (only one shown) which extend along adjacent sides of the receptacle 16.

As is clearly shown in FIG. 1, and for example at station G, there is provided a pivotally mounted, spring controlled, tripping mechanism 26 (one for each spring 23), each of which, when tripped into the position shown in this view, engages its respective spring 23 and thus reduces the tension thereof sufficiently with respect to the movable end wall 22 so that it may move slightly relatively to the fixed side walls of the receptacle 16, thus facilitating introduction of the requisite number of positive and negative plates and interposed separators for subsequent assembly thereto by the operator of the terminal bars and connecting rods as well as the soldering operation which is conducted at station S.

With further reference to FIG. 1, it will be observed that the spaced diametrically opposed trackways 10, although otherwise continuous, are provided with suitable openings directly beneath the soldering station S for a purpose that will now become apparent.

A yoke 24 is suitably and slidably positioned relative to the frame B and directly beneath the soldering station S. A power cylinder also supported by the frame B positioned perpendicularly beneath the yoke 24 is associated therewith through bolt means shown and is adapted to lift the receptacle 16 with its assembled battery-building elements directly into contact with the securing mechanism at station S.

As soon as the receptacle and its contents are lifted into the head 27 at soldering station S, the operator, by means of a crank 28, inserts the comb-like elements carried in the head into position to insure and maintain proper spacing of all of the plates during the soldering operation. As soon as the comb elements are in position, the operator then inserts a pole rod and the requisite terminal lugs and the soldering operation is completed. As is well-known in the art, the comb-like elements are applied not only for proper spacing of the plates, but also to prevent the molten metal from flowing downwardly thereon.

As soon as the soldering operation is completed the comb-like elements are removed, the timing interval of the power cylinder being coordinated with the advancement of the several receptacles from the filling to the soldering as well as to the unloading station, and the cylinder 25 is de-activated to lower the receptacle from the soldering position back within the opening in the trackway whence it advances to the unloading station D.

Immediately upon the receptacle 16 being disengaged from the chain drive 11 and as it is lifted into the soldering position at station S, the drive means 14, through the operation of the electric motor and its clutch controls, gradually lowers the receptacle from the full line position thereof shown at station G toward the phantom line position illustrated therebelow. During this period of operation of the apparatus and simultaneously with the soldering operation being conducted, the orienting means is feeding the battery-building elements, in seriatim, into the receptacle 16, at station G. It is to be understood that the controls of the apparatus are interrelated and coordinated in such a manner as to permit the receptacle 16 to be gradually lowered in spaced increments in the reverse direction so that any component of the stack being formed at this station is inserted at a constant height. Thus, it will be seen that the specific distance of travel and driving speed selected for moving of the receptacle 16 from the full line position (F2) toward the phantom lines during which time it is loaded is dependent upon the total thickness of the series of components stacked. The time interval for the stacking or loading operation is coordinated with the speed required by the soldering station S and when the cylinder 25 is reactuated to lower the soldered series onto the chain, the electric motor 15, through its appropriate controls, moves this assembly to the unloading station D while the latest stacked receptacle is advanced to the soldering station G, the entire operation of the apparatus being continuous and repetitive.

At station D, the trigger mechanism 26 previously described in connection with the filling operation at station G is reactuated to relieve the tension of the springs 23 so that the movable end wall 22 will be free to have sufficient relative movement so that the soldered battery assembly may be unloaded from the receptacle 16 by an operator. Thereafter, the empty receptacle then moves downwardly, as indicated by the arrow F1, where it once again progresses to the filling station for the filling operation, as previously described.

With reference to FIG. 2, there is illustrated in side elevation an orienting station which is mounted on a pedestal or frame 29. At a suitable height thereabove there is provided a horizontal platform or table 29a that is adapted to support a spaced array of tubular containers or holders 33–38 which have open tops and bottom walls. Adjacent to the platform 29a, as best shown in FIG. 3, spaced slightly therefrom and coplanar therewith, is the upper flight of an endless conveyor 30 which is entrained about transversely extending pulley means 31 and 31a, either of which may be suitably driven in timed relation to the operation of the filling and soldering means by the power unit 39. The idler pulley means are shown at 32 and 32a for maintaining the conveyor belt in a taut condition. Further, in FIG. 2 there is shown in a position outboard of the conveyor belt 30 spaced, longitudinally upstanding means which are associated with the vacuum chamber, the latter of which is provided with suitable conduits leading to the plural suction means previously described and indicated at 47 and 51, respectively.

From a further examination of FIG. 3 it will be seen that containers 33, 35 and 37 are adapted to accommodate positive and negative plates while holders 34, 36 and 38 contain separators.

Figure 4:
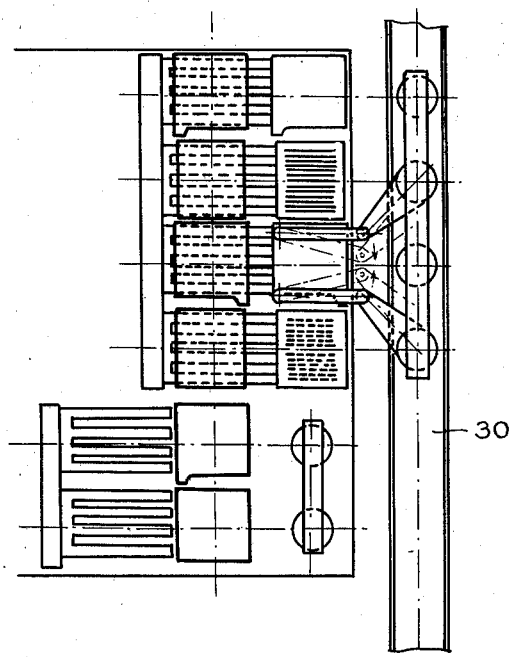
FIG. 4 is another diagrammatic top plan view of the machine generally corresponding to FIG. 3 and in which the discharge mechanism has now advanced a plurality of battery-building elements from the containers into alignment on the table adjacent thereto, at which time the suction means is positioned above the conveyor.

A pair of horizontally aligned, longitudinally extending members 43 and 45, provided with spaced groups of bifurcated members 44 and 46, are adapted to be operated in timed relation (by power unit 39) to discharge simultaneously from the bottom of the container one each of the elements held therein onto the platform 53, as is best shown in FIG. 4. Substantially simultaneously with the advancement of the bifurcated members 44 and 46 beneath the containers 33 through 38 for moving the plates and separators onto the platform 53, the suction mechanism is moved from its position shown in FIG. 3 to the outboard position shown in FIG. 4.

Simultaneously with the withdrawal of the bifurcated members 44 and 46 from beneath the containers 33 through 38, the suction mechanism is moved transversely back over the platform 29a in position to lift the plates and separators positioned therebeneath and move them transversely to a position above the endless belt 30 and discharge them thereonto.

Upon an examination of the separator elements 34 and 36, it will be noted that the ribs are (FIG. 4) extended in the same plane as the bifurcated elements 44 and 46 when they are discharged from their respective containers. However, for efficient battery construction and operation, it is necessary that the separators be rotated through an arc of 90° (FIG. 6) so that the ribs of the separators extend longitudinally of the conveyor 30.

Figure 5:
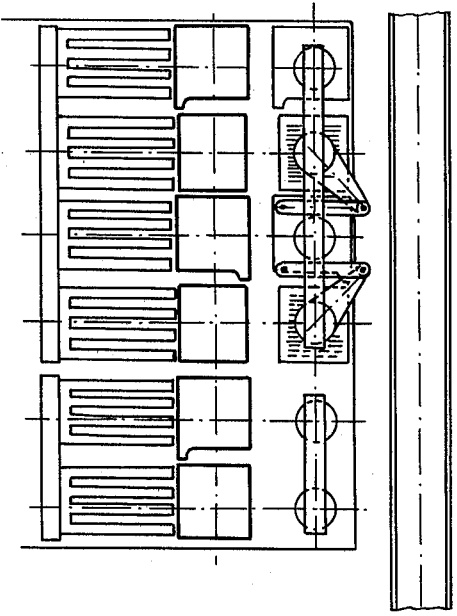
FIG. 5 is still another diagrammatic top plan view of the means shown in FIG. 3 and in which the suction means has moved transversely into position above the aligned battery-building elements preparatory to lifting them from the table and advancing them to the conveyor and the discharge mechanism is now retracted into its initial inoperative position from beneath the containers.

The rotation of the separators 34 and 36 is achieved by the cooperation of the elements best shown in FIGS. 3 through 6. In FIG. 3, which best illustrates this means in its inoperative position, the discharge means 44 and 46 are spaced away from the respective containers and the suction assembly supported by arms 49 and 51 is positioned over the table 29a. Upon placing the apparatus into operation through power unit 39, the suction assembly steps sidewise outboard to a position over the conveyor belt 30 and the discharge members push a first series of positive and negative plates and separators onto the table 29a (FIG. 4). Close examination of FIGS. 3 and 4 indicates that a part of the suction assembly is supported in a unique manner whereby it may swivel by means of articulated links 48 and cranks 50. Consequently, when the battery-building elements are aligned, as best shown in FIG. 4, and the suction assembly moves transversely back over the table 29a, the links 48 pivot toward each other as shown by the arrows, and the suction assembly and the suction elements carried thereby are caused to oscillate 90°. In FIG. 5, the suction assembly is there shown in position to lift the plates and separators from the table 29a and place them on the conveyor 30 (see now FIG. 6), and during this lateral displacement of the suction assembly, the swiveling once again takes place, so that when the plates and separators are released for their longitudinal travel on the conveyor belt in a taut condition. Further, in FIG. 2 there is discharge means 44 and 46 and extend longitudinally of the conveyor belt 30.

Although not shown in the drawing of FIGS. 3–6, the several suction cups denoted by the reference numeral 51a are also provided with means to cause oscillation of at least one thereof, as heretofore described in connection with the articulation of links 48 and levers 50.

Although one embodiment of the invention has been depicted and described, it will be apparent that this embodiment is illustrative in nature and that a number of modifications in the apparatus and variations in its end use may be effected without departing from the spirit or scope of the invention as defined in the appended claims.

What we claim is:

1. In an automatic machine for assembling storage battery elements comprising an aligned series of holders for the battery elements to be assembled, a first conveyor belt having an exit end portion adapted to travel in a horizontal path in a plane parallel with the aligned series of holders and immediately adjacent to said holders, suction means for transferring the battery elements from the holders and depositing them on the conveyor belt in an aligned series, a second conveyor means traveling in alignment with said first conveyor belt and carrying a receptacle which cooperates with the exit end of said first conveyor belt for introduction of said battery elements within said receptacle and means for moving the receptacle in successive increments of reverse travel while successive elements are being fed and until a proper number of elements have been deposited in said receptacle whereupon the receptacle is moved in the opposite direction to a securing station and then to an unloading station.

2. In an automatic machine for assembling storage battery elements as claimed in claim 1, wherein said suction means for transferring the battery elements from the holders includes a plurality of means one each of which is adapted to cooperate with each of said holders and articulated linkage means cooperative with at least a portion of said suction means to impart horizontal oscillatory motion to said last-named means so that the battery elements which are being transferred from the holders by the suction means controlled by said articulated linkage means are rotated 90° before being placed on the first conveyor.

3. In an automatic machine for assembling storage battery elements as claimed in claim 1, wherein a picking conveyor is interposed between the first and second conveyors, said picking conveyor being positioned in a plane substantially coextensive with the exit end of the first conveyor and adapted to transfer the battery elements in seriatim to the receptacle carried by the second conveyor.

4. In an automatic machine for assembling storage battery elements as claimed in claim 1, wherein means are adapted to raise the filled receptacle from the second conveyor means into the securing station while an adjacent receptacle is being filled.

5. In an automatic machine for assembling storage battery elements as claimed in claim 1, wherein said second conveyor means is provided with a plurality of spacedly arranged receptacles.

6. In an automatic machine for assembling storage battery elements as claimed in claim 5, wherein each of the receptacles transported by the second conveyor means includes plural fixed walls and at least one movable wall, spring means associated with said movable wall for maintaining the same in closed position relative to the other walls of said receptacle, and trigger means for overcoming the tension of said spring means at predetermined positions of the receptacle as the receptacle moves through its closed path of travel delineated by said conveyor means.

References Cited by the Examiner

UNITED STATES PATENTS

| | | | |
|---|---|---|---|
| 2,405,174 | 7/46 | Underwood. | |
| 2,427,712 | 9/47 | Casler et al. | 29—204 |
| 2,790,536 | 4/57 | Reed | 198—35 |
| 3,025,590 | 3/62 | Litz | 29—201 X |

FOREIGN PATENTS

| | | |
|---|---|---|
| 845,211 | 8/60 | Great Britain. |

WHITMORE A. WILTZ, *Primary Examiner.*

THOMAS H. EAGER, *Examiner.*

UNITED STATES PATENT OFFICE

CERTIFICATE OF CORRECTION

Patent No. 3,210,833                         October 12, 1965

François Budin et al.

It is hereby certified that error appears in the above numbered patent requiring correction and that the said Letters Patent should read as corrected below.

Column 5, line 62, strike out "in a taut condition. Further, in FIG. 2 there is" and insert instead -- , the ribs of the separators are now normal to the --.

Signed and sealed this 24th day of May 1966.

(SEAL)
Attest:

ERNEST W. SWIDER                          EDWARD J. BRENNER
Attesting Officer                           Commissioner of Patents